US012620068B2

(12) United States Patent
Jeong et al.

(10) Patent No.: US 12,620,068 B2
(45) Date of Patent: May 5, 2026

(54) DEVICE AND METHOD FOR TEXTURE-AWARE SELF-SUPERVISED BLIND DENOISING USING SELF-RESIDUAL LEARNING

(71) Applicant: KOREA UNIVERSITY RESEARCH AND BUSINESS FOUNDATION, Seoul (KR)

(72) Inventors: Wonki Jeong, Seoul (KR); Kanggeun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 310 days.

(21) Appl. No.: 18/372,397

(22) Filed: Sep. 25, 2023

(65) Prior Publication Data

US 2024/0202883 A1     Jun. 20, 2024

(30) Foreign Application Priority Data

Dec. 14, 2022    (KR) ........................ 10-2022-0174325
Mar. 14, 2023    (KR) ........................ 10-2023-0033553

(51) Int. Cl.
*G06T 5/70*          (2024.01)
*G06T 3/40*          (2006.01)
*G06T 5/50*          (2006.01)

(52) U.S. Cl.
CPC .................. *G06T 5/70* (2024.01); *G06T 3/40* (2013.01); *G06T 5/50* (2013.01); *G06T 2207/20081* (2013.01); *G06T 2207/20084* (2013.01)

(58) Field of Classification Search
CPC .... G06T 5/70; G06T 3/40; G06T 5/50; G06T 2207/20081; G06T 2207/20084;
(Continued)

(56) References Cited

U.S. PATENT DOCUMENTS

2021/0360179 A1    11/2021  Dangi et al.

FOREIGN PATENT DOCUMENTS

CN          106709879 A  *  5/2017  ............... G06T 5/70
CN          108280811 A  *  7/2018  ............... G06T 5/70
(Continued)

OTHER PUBLICATIONS

Zhou, Yuqian, et al. "When AWGN-based Denoiser Meets Real Noises." Proceedings of the AAAI Conference on Artificial Intelligence., arXiv:1904.03485v1 Apr. 6, 2019, (10 pages).
(Continued)

*Primary Examiner* — Jose L Couso
(74) *Attorney, Agent, or Firm* — NSIP Law

(57) ABSTRACT

The present invention relates to a blind denoising device including: a receiving unit for receiving an original noisy image; a Pixel-shuffle Downsampling (PD) unit for performing PD for the original noisy image to produce at least one or more downsampled images; a predicted image producing unit for eliminating the noise from the original noisy image and the downsampled images to produce at least one or more predicted images restored to the shape of the original noisy image; and a learning unit for performing optimized learning for the predicted image producing unit, based on at least one or more self-supervised losses of the predicted images and the original noisy image.

14 Claims, 5 Drawing Sheets

(58) Field of Classification Search

CPC ... G06T 2207/10004; G06T 5/60; G06T 5/73; G06T 2207/10024; G06T 2207/20024; G06T 2207/20182; G06T 3/4046; G06T 9/002; G06T 2207/20076; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06V 10/30; G06F 18/214; G06F 18/22; G06F 18/241; G06F 18/24; G06F 18/2411; G06F 18/2415; G06F 30/27; Y10S 128/925; H04N 5/21; H04N 5/213; H04N 9/646

See application file for complete search history.

(56) References Cited

FOREIGN PATENT DOCUMENTS

| CN | 113191968 | A | * | 7/2021 | | G06F 18/214 |
|----|-----------|---|---|--------|---|-------------|
| CN | 113892116 | A | * | 1/2022 | | G06T 3/4053 |
| CN | 115311149 | A | * | 11/2022 | | G06T 5/70 |
| JP | 6507846 | B2 | | 5/2019 | | |
| KR | 10-2017-0107252 | A | | 9/2017 | | |
| KR | 10-2020-0058440 | A | | 5/2020 | | |
| KR | 10-2022-0165181 | A | | 12/2022 | | |
| KR | 10-2022-0167824 | A | | 12/2022 | | |
| KR | 10-2490586 | B1 | | 1/2023 | | |

OTHER PUBLICATIONS

Huang, Tao, et al. "Neighbor2neighbor: Self-Supervised Denoising from Single Noisy Images." Proceedings of the IEEE/CVF conference on computer vision and pattern recognition. 2021., (10 pages).

Lee, Wooseok, et al, "AP-BSN: Self-Supervised Denoising for Real-World Images via Asymmetric PD And Blind-Spot Network." Proceedings of the IEEE/CVF Conference on Computer Vision and Pattern Recognition. 2022., (10 pages).

Extended European search report issued on Mar. 22, 2024, in counterpart European Patent Application No. 23198925.2 (8 pages).

Zhou et al. "When AWGN-based Denoiser Meets Real Noises" *Proceedings of the AAAI Conference on Artificial Intelligence.* Nov. 19, 2019 (pp. 1-9).

Lee et al. "AP-BSN: Self-Supervised Denoising for Real-World Images via Asymmetric PD and Blind-Spot Network" *Proceedings of the IEEE/CVF Conference on Computer Vision and Pattern Recognition.* 2022 (pp. 1-16).

Wang et al. "Blind2Unblind: Self-Supervised Image Denoising with Visible Blind Spots" *Proceedings of the IEEE/CVF Conference on Computer Vision and Pattern Recognition.* 2022 (pp. 2027-2036).

* cited by examiner

<u>100</u>

<u>130</u>

<ins>100</ins>

| Ablation study (w/o) | $L_r$ | $L_{ov}$ | $L_{np}$ | 12V$^B$ |
|---|---|---|---|---|
| PSNR ↑ | 29.10 | 36.12 | 36.77 | 36.63 |
| SSIM ↑ | 0.648 | 0.877 | 0.877 | 0.888 |
| LPIPS ↑ | 0.464 | 0.244 | 0.295 | 0.251 |
| DISTS ↑ | 0.306 | 0.211 | 0.259 | 0.218 |

DEVICE AND METHOD FOR TEXTURE-AWARE SELF-SUPERVISED BLIND DENOISING USING SELF-RESIDUAL LEARNING

CROSS-REFERENCE TO RELATED APPLICATION

This application claims priority to Korean Patent Application Nos. 10-2022-0174325, filed on Dec. 14, 2022 and 10-2023-0033553, filed on Mar. 14, 2023, and all the benefits accruing therefrom under 35 U.S.C. § 119, the contents of which in their entireties are herein incorporated by reference.

TECHNICAL FIELD

The present invention relates to a device and method for texture-aware self-supervised blind denoising using self-residual learning, more specifically to a blind denoising device and method that makes use of a loss function-based denoising model learning and inference for eliminating noise generated in a process of acquiring an image.

BACKGROUND ART

Conventional self-supervised blind denoising shows poor quality in real-world images due to spatially correlated noise corruption. Recently, Pixel-shuffle Downsampling (PD) has been proposed to eliminate the spatial correlation of the noise.

A study combining asymmetric PD (AP) and a blind-spot network (BSN) successfully demonstrates that self-supervised blind denoising is applicable to real-world noisy images.

However, PD-based inference of the BSN may degrade texture details in the testing phase (denoising step) because high-frequency details (e.g., edges) are destroyed in the downsampled images.

To solve such a problem, a model capable of eliminating noise, without the PD process, is needed to allow texture details to be kept. Further, a new inference system is required to boost overall performance, while avoiding the use of an order-variant PD constraint, noise prior knowledge-based loss function, and the PD.

PRIOR ART LITERATURE (Patent Literature 0001) Korean Patent Application Laid-open No. 10-2022-0167824 (Dec. 22, 2022)

DISCLOSURE

Technical Problem

Accordingly, the present invention has been made in view of the above-mentioned problems occurring in the related art, and it is an object of the present invention to provide a blind denoising device and method that is capable of learning a denoising model only using a noisy image to eliminate noise, without a PD process, in a testing step, so that texture details of an original image are kept, without degrading.

Technical Solution

To accomplish the above-mentioned objects, according to one aspect of the present invention, a blind denoising device may include: a receiving unit for receiving an original noisy image; a Pixel-shuffle Downsampling (PD) unit for performing PD for the original noisy image to produce at least one or more downsampled images; a predicted image producing unit for eliminating the noise from the original noisy image and the downsampled images to produce at least one or more predicted images restored to the shape of the original noisy image; and a learning unit for performing optimized learning for the predicted image producing unit, based on at least one or more self-supervised losses of the predicted images and the original noisy image.

Further, the PD unit may produce the at least one or more downsampled images from the original noisy image according to at least one or more stride factors to thus augment data of the original noisy image.

Furthermore, the PD unit may perform order-variant PD using transformation matrices selected randomly, and the transformation matrices may be shuffled in the sampling order.

Moreover, the predicted image producing unit may include a first network for eliminating the noise from the original noisy image and the downsampled images, a second network for eliminating the noise from the downsampled images according to the stride factors, and a restoring part for restoring the shape of the original noisy image from the images from which the noise is eliminated through the first network and the second network to thus produce the predicted images.

Further, the learning unit may perform learning for the first network and the second network, based on a first self-supervised loss defining a loss of the second network, a second self-supervised loss for supporting residual noise learning of the first network, a third self-supervised loss for enhancing the similarity between the predicted images produced through the first network and the second network, and a fourth self-supervised loss for limiting the distribution of the predicted images produced through the first network.

Further, the first self-supervised loss may define the loss of the second network from a difference between the predicted image produced through the second network and the original noisy image.

Furthermore, the second self-supervised loss may be defined as a difference between a pseudo-noise map and the predicted image produced through the first network, the pseudo-noise map may be produced from a difference between the original noisy image and the predicted image produced through the second network, and the predicted image produced through the first network may be the predicted image from the original noisy image.

Moreover, the third self-supervised loss may be defined, based on a difference image between the original noisy image and the predicted image produced through the first network and a difference value between the predicted images produced through the second network, to enhance the similarity of low-frequency characteristics between the predicted image produced through the first network and the predicted images produced through the second network, and the predicted images produced through the first network and the second network may be the predicted images from the downsampled images according to the same stride factor.

Additionally, the fourth self-supervised loss may be noise prior loss that penalizes noise having higher size than a threshold value to allow the noise distribution of the predicted image produced through the first network to be close to the noise distribution of the original noisy image, and the predicted image produced through the first network may be the predicted image from the original noisy image.

To accomplish the above-mentioned objects, according to another aspect of the present invention, a blind denoising method may include the steps of: receiving an original noisy image; performing PD for the original noisy image to produce at least one or more downsampled images; eliminating the noise from the original noisy image and the downsampled images to produce at least one or more predicted images restored to the shape of the original noisy image; and performing optimized learning for a predicted image producing unit, based on at least one or more self-supervised losses of the predicted images and the original noisy image.

Further, the step of producing the at least one or more predicted images may include the steps of: eliminating the noise from the original noisy image and the downsampled images through a first network; eliminating the noise from the downsampled images according to different stride factors through a second network; and restoring the shape of the original noisy image from the images from which the noise is eliminated through the first network and the second network to thus produce the predicted images through a restoring part.

Further, the step of performing optimized learning for a predicted image producing unit may include the step of performing learning for the first network and the second network, based on a first self-supervised loss defining a loss of the second network, a second self-supervised loss for supporting residual noise learning of the first network, a third self-supervised loss for enhancing the similarity between the predicted images produced through the first network and the second network, and a fourth self-supervised loss for limiting the distribution of the predicted images produced through the first network.

Furthermore, the first self-supervised loss may define the loss of the second network from a difference between the predicted image produced through the second network and the original noisy image.

Furthermore, the second self-supervised loss may be defined as a difference between a pseudo-noise map and the predicted image produced through the first network, the pseudo-noise map may be produced from a difference between the original noisy image and the predicted image produced through the second network, and the predicted image produced through the first network may be the predicted image from the original noisy image.

Moreover, the third self-supervised loss may be defined, based on a difference image between the original noisy image and the predicted image produced through the first network and a difference value between the predicted images produced through the second network, to enhance the similarity of low-frequency characteristics between the predicted image produced through the first network and the predicted images produced through the second network, and the predicted images produced through the first network and the second network may be the predicted images from the downsampled images according to the same stride factor.

Additionally, the fourth self-supervised loss may be noise prior loss that penalizes noise having higher size than a threshold value to allow the noise distribution of the predicted image produced through the first network to be close to the noise distribution of the original noisy image, and the predicted image produced through the first network may be the predicted image from the original noisy image.

Effectiveness of Invention

According to the present invention, the blind denoising device and method can perform denoising model learning only using the noisy image, restore high-frequency characteristics such as texture more effectively than the recent method, and eliminate the spatially correlated noise as well as the pixel-unit noise.

MODE FOR INVENTION

Figure 1:
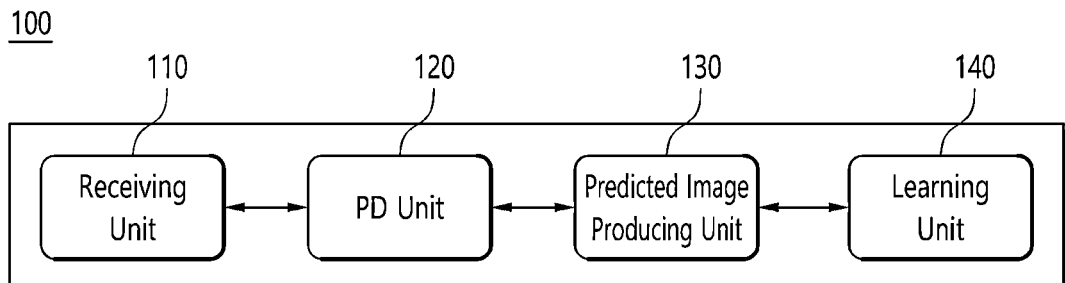
FIG. 1 is a schematic block diagram showing a configuration of a blind denoising device according to the present invention.

An explanation on embodiments of the present invention will be given in detail with reference to the attached drawing. The embodiments of the present invention as will be discussed later will be in detail described so that it may be carried out easily by those having ordinary skill in the art, and therefore, this does not limit the idea and technical scope of the invention. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. It is therefore evident that the particular embodiments disclosed above may be altered or modified and all such variations are considered within the scope of the disclosed subject matter. Accordingly, the protection sought herein is as set forth in the claims below. In the description, it should be noted that the parts corresponding to those of the drawings are indicated by corresponding reference numerals.

Hereinafter, embodiments of the present invention will now be described in detail with reference to the attached drawings.

Figure 2:
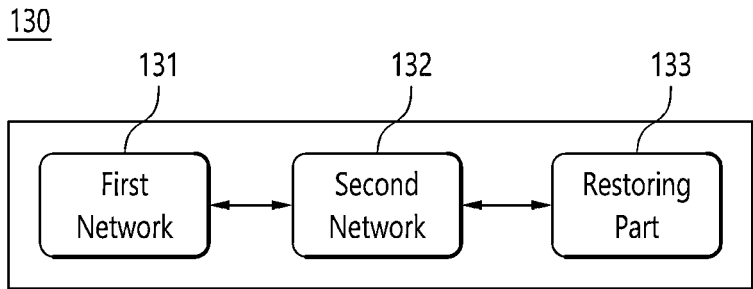
FIG. 2 is a schematic block diagram showing a predicted image producing unit according to the present invention.

FIG. 1 is a schematic block diagram showing a configuration of a blind denoising device according to the present invention, and FIG. 2 is a schematic block diagram showing a predicted image producing unit according to the present invention.

Referring to FIG. 1, the blind denoising device 100 according to the present invention includes a receiving unit 110, a PD unit 120, a predicted image producing unit 130, and a learning unit 140.

According to the present invention, the receiving unit 110 receives an original noisy image. For example, the original image in the description represents an image that does not have any separate compression after produced and is not transmitted to a separate device or server, that is, an image where no loss is generated. The noise represents the damaged portions of image pixels that are generated by the compression applied to the original image or by the transmission of the original image. In the description, the term 'image' may include a still image or a unit image (e.g., frame) constituting a video.

According to the present invention, the PD unit 120 performs pixel-shuffle downsampling (PD) for the original noisy image to produce at least one or more downsampled images.

For example, the PD performed by the PD unit 120 is a process of augmenting the original noisy image to one or more pixel-shuffled images, more particularly a process of producing a plurality of downsampled images from the original noisy image according to at least one or more stride factors to thus augment data of the original noisy image. The process will be explained with reference to FIGS. 3 and 4.

Figure 3:
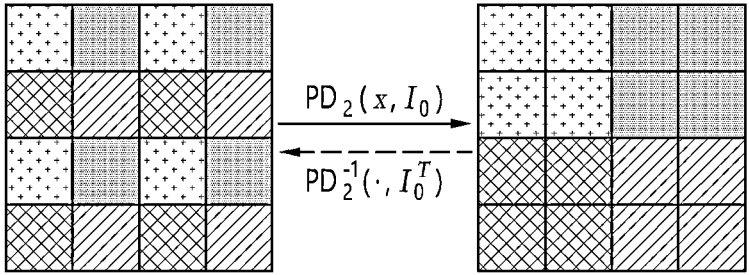
FIGS. 3 and 4 show a conventional method and a method according to the present invention for augmenting data of an original image.
Figure 4:
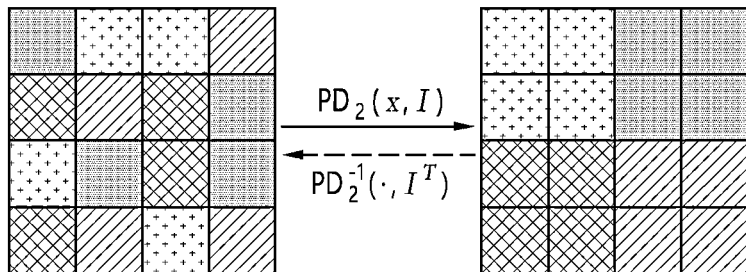

FIGS. 3 and 4 show a conventional method and a method according to the present invention for augmenting data of the original noisy image.

FIGS. 3 and 4 show examples of order-invariant PD and order-variant PD for stride factor $PD_2$.

First, FIG. 3 shows a conventional PD method for augmenting data of original noisy image to produce downsampled images.

The conventional PD method as shown in FIG. 3 shows the PD for the original noisy image with transformation matrices $I_0$.

In specific, the conventional PD method as shown in FIG. 3 performs the PD for the original noisy image with spatially correlated noise only using self-supervised loss $L_s$.

The self-supervised loss $L_s$ is represented by the following mathematical expression 1.

$$L_s(f, x) = E_x \| (f(x; I_0, PD_5) - x \|_{1|} \qquad \text{[Mathematical expression 1]}$$

wherein the x represents the original noisy image, the f BSN, the $PD_5$ a PD function having stride factor s (in this case, s is 5), and $I_0$ the transformation matrices for the order-invariant PD.

The conventional order-invariant PD produces the downsampled images only using the self-supervised loss $L_s$ in predetermined pixel sampling order, thereby resulting in the production of the limited number of sub images. For example, as shown in FIG. 3, the order-invariant PD produces four 2×2 sub images from a 4×4 input image.

In specific, the conventional order-invariant PD is a method for extracting pixels regularly to produce downsampled images, so that it is performed for the original noisy image with spatially correlated noise only using the self-supervised loss $L_s$, thereby making it hard to effectively eliminate the spatially correlated noise.

Contrarily, the order-variant PD according to the present invention is performed even for irregular pixels, and an explanation of the order-variant PD will be given with reference to FIG. 4.

FIG. 4 shows a PD method according to the present invention for augmenting data of the original noisy image to produce downsampled images.

The PD method according to the present invention as shown in FIG. 4 is the order-variant PD for the original noisy image with arbitrarily irregularly produced transformation matrices $I \in I$.

As shown in FIG. 4, the PD according to the present invention is the order-variant PD for shuffling sampling order using the transformation matrices I selected randomly to augment the number of downsampled images (in this case, the transformation matrices may be shuffled in the sampling order). The self-supervised loss $L_s$ used in the order-variant PD according to the present invention is represented by the following mathematical expression 2.

$$L_s(f, x, \tau) = E_{x,I} \in \tau \| (f(x; I, PD_5) - x \|_1 \qquad \text{[Mathematical expression 2]}$$

wherein the x represents the original noisy image, the f BSN as a second network 132, the I the transformation matrices for the order-variant PD, and the $PD_5$ a PD function having stride factor s (in this case, s is 5).

The order-variant PD according to the present invention is performed even for irregular pixels, so that a process of segmenting the original noisy image into the plurality of downsampled images is performed to allow the spatial correlation of the noise to disappear, thereby making it very easy to eliminate the noise. Further, the PD according to the present invention is performed even for various images, thereby having no limitations in the types of images.

To upgrade denoising performance according to the order-variant PD of the present invention and to reduce visual artifacts of the AP-BSN, a post-processing method, random-replacing refinement ($R^3$) has been proposed in the conventional practice.

The $R^3$ represents the average of the images restored from various images, with which noise is synthesized, produced by randomly replacing noise by pixel (selected in x) with initially predicted f (x; $I_0$, $PD^2$). However, the $R^3$ is likely to make the restored images excessively smooth through repeated denoising, thereby causing texture details to be lost. An explanation of such a problem will be given in detail later with reference to FIG. 6.

Referring back to FIG. 1, the predicted image producing unit 130 according to the present invention serves to eliminate the noise from the original noisy image and the downsampled images to thus produce at least one or more predicted images restored to the shape of the original noisy image. A configuration of the predicted image producing unit 130 will be explained with reference to FIGS. 2 and 5.

Figure 5:
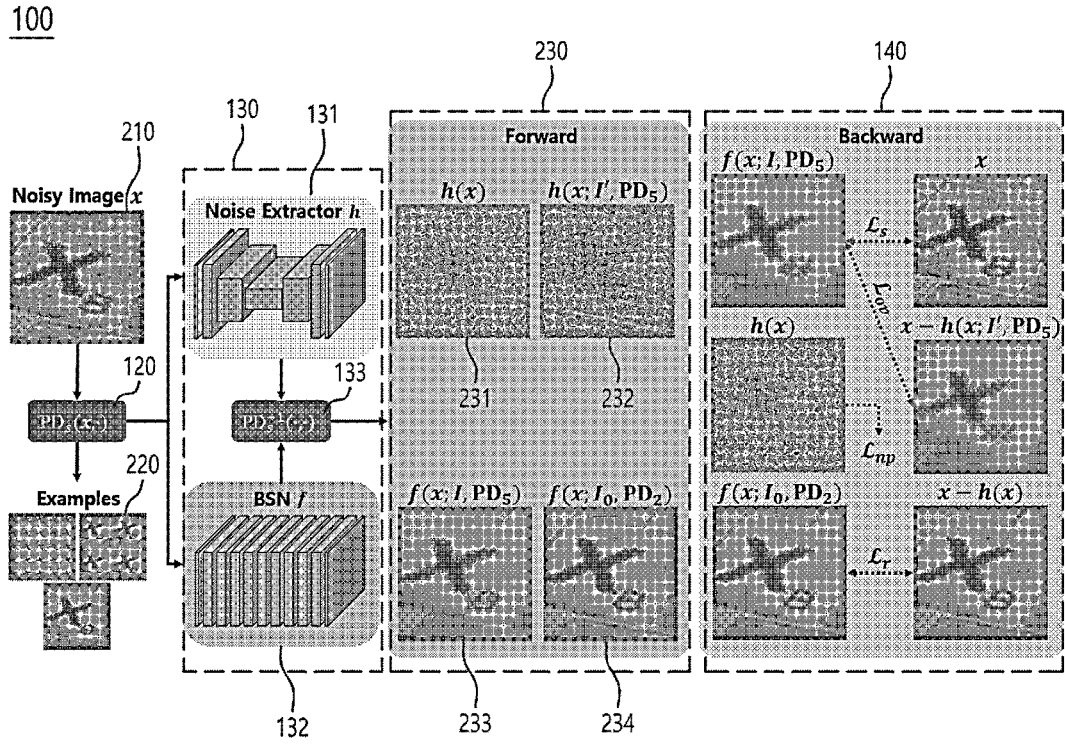
FIG. 5 shows a learning process of the predicted image producing unit according to the present invention.

FIG. 2 is a schematic block diagram showing the predicted image producing unit according to the present invention, and FIG. 5 shows a learning process of the predicted image producing unit according to the present invention.

Referring to FIGS. 2 and 5, the predicted image producing unit 130 according to the present invention includes a first network 131, the second network 132, and a restoring part 133 to produce predicted images 230. In specific, the first network 131 eliminates noise from the original noisy image 210 and the downsampled images 220, the second network 132 eliminates noise from the at least one or more downsampled images 220 according to different stride factors, and the restoring part 133 restores the shape of the original noisy image 210 from the images from which noise is eliminated through the first network 131 and the second network 132 to thus produce the predicted images 230 as shown in a forward step of FIG. 5.

Further, the second network 132 is limited in a structure thereof, unlike a recent network, and accordingly, the second network 132 is available when satisfying a given condition where the pixel shapes of input and output are independent of each other.

Contrarily, the first network 131 makes use of network learning even though such a given condition is not satisfied, and further, the PD process may be omitted to thus improve noise learning performance. If the PD process in a learning process is omitted, the PD process in a denoising process may be omitted, thereby resulting in the improvement of the denoising performance.

Further, the predicted images 230 include a first predicted image 231 produced by eliminating the noise from the original noisy image 210 through the first network 131, a second predicted image 232 produced by eliminating the noise from the downsampled images 220 through the first network 131, and third and fourth predicted images 233 and 234 produced by eliminating the noise from the plurality of downsampled 220 according to the different stride factors through the second network 132.

In specific, the first predicted image 231 is an image produced by eliminating the noise detected from the original noisy image 210 through the first network 131, while not performing the order-variant PD process. The second predicted image 232 is an image produced by eliminating the $PD^5$ noise detected from the downsampled images 220 according to the stride factor $PD_5$ through the first network 131. The third predicted image 233 is an image produced by eliminating the $PD_5$ noise detected from the downsampled images 220 according to the stride factor $PD_5$ through the second network 132. The fourth predicted image 234 is an image produced by eliminating the $PD_2$ noise detected from the downsampled images 220 according to the stride factor $PD_2$ through the second network 132.

That is, the first predicted image 231 is an image that is produced by eliminating the noise from the original noisy image 210 where no PD is performed through the first network 131 and thus restored to the shape of the original noisy image 210 (in FIG. 5, "$PD_S^{-1}(\cdot, \cdot)$"). The second to fourth predicted images 232 to 234 are images that are produced by eliminating the noise from the original noisy image 210 where the PD (in FIG. 5, "$PD_S(x, \cdot)$") is performed through the first and second networks 131 and 132 and thus restored to the shape of the original noisy image 210 (in FIG. 5, "$PD_S^{-1}(\cdot, \cdot)$"). The first to fourth predicted images 231 to 234 are produced to the shapes shown in the forward step of FIG. 5.

Referring to FIGS. 1 and 5, according to the present invention, the learning unit 140 serves to perform optimized learning for the predicted image producing unit 130, based on at least one or more self-supervised losses of the predicted images 230 and the original noisy image 210.

In specific, the learning unit 140 performs learning for the first network 131 and the second network 132, based on a first self-supervised loss defining a loss of the second network 132 itself, a second self-supervised loss for supporting residual noise learning of the first network 131, a third self-supervised loss for enhancing the similarity between the predicted images 230 produced through the first network 131 and the second network 132, and a fourth self-supervised loss for limiting the distribution of the predicted images 230 produced through the first network 131.

The first self-supervised loss $L_s$ is a loss function defining a loss of the second network 132 itself from a difference between the third predicted image 233 as one of the predicted images 230 produced through the second network 132 and the original noisy image 210. If the first self-supervised loss $L_s$ is used for the residual noise learning of the first network 131, it is possible that the noise learning is performed only with the noisy image produced therein, without any separate noisy image. In this case, the first self-supervised loss $L_s$ is defined by the mathematical expression 2.

That is, the first self-supervised loss $L_s$ is the same as the self-supervised loss $L_s$ used in the PD process according to the present invention.

The second self-supervised loss $L_r$ is defined as a difference between a pseudo-noise map and the first predicted image 231 as one of the predicted images 230 produced through the first network 131. In this case, the pseudo-noise map is produced from a difference between the original noisy image 210 and the fourth predicted image 234 as one of the predicted images 230 produced through the second network 132. The second self-supervised loss $L_r$ is defined by the following mathematical expression 3.

$$L_r(f, h, x) = E_x \|x - f(x; I_0, PD_2) - h(x)\|_1 \quad \text{[Mathematical expression 3]}$$

wherein the x represents the original noisy image 210, the $x - f(x; I_0, PD_2)$ the pseudo-noise map, and $h(x)$ the first predicted image 231.

The second self-supervised loss $L_r$ solves learning-interference data distribution mismatch and blurring artifacts that are caused by the excessive downsampling in the process of $PD_5$. In this case, it is important that if the downsampled images 220 according to the stride factor $PD_2$ are used in the learning step, they have to be used even in the denoising step.

In the second self-supervised loss $L_r$, the order-variant PD having the $I_0$ is advantageously available in minimizing aliasing artifacts of the first network 131. The pseudo-noise map can consider the spatially correlated real-world noise and the aliasing artifacts caused by the downsampling. According to the present invention, it is found that the pseudo-noise map has a better quality of texture restoration than the predicted images 230 produced by the first network 131.

Unlike the conventional network performing the learning only using the $PD_5$, the original noisy image 210 as learning data can be a high-resolution noisy image. Further, J-invariant properties are not needed in a structure of the first network 131. Accordingly, all types of recent network architecture for image restoration is available for the first network 131.

The third self-supervised loss $L_{ov}$ is defined by the following mathematical expression 4, based on a difference image between the original noisy image 210 and the predicted image 230 produced through the first network 131 and a difference value between the predicted images 230 produced through the second network 132, to enhance the similarity of low-frequency characteristics between the predicted image 230 produced through the first network 131 and the predicted image 230 produced through the second network 132. In this case, the predicted image 230 produced through the first network 131 is the second predicted image 232, and the predicted image 230 produced through the second network 132 is the third predicted image 233. Further, the second predicted image 232 and the third predicted image 233 are the predicted images 230 from the downsampled images 220 according to the same stride factor $PD_5$.

$$L_{ov}(f, h, x, \tau) = \quad \text{[Mathematical expression 4]}$$
$$E_{x;I,I'} \in \tau \|x - f(x; I, PD_5) - h(x; I', PD_5)\|_1$$

wherein the x represents the original noisy image 210, the f BSN as the second network 132, the I and I' transformation matrices for order-variant PD, the $PD_5$ the PD function having stride factor s (in this case, s is 5), the h noise extractor h as the first network 131, the f(x; I, $PD_5$) the third predicted image 233, and the h(x; I', $PD_5$) the second predicted image 232.

The fourth self-supervised loss $L_{np}$ is noise prior loss that penalizes noise having higher size than a threshold value to allow the noise distribution of the predicted image 230 produced through the first network 131 to be close to the noise distribution of the original noisy image 210, which is defined by the following mathematical expression 5. In this case, the predicted image 230 produced through the first network 131 is the first predicted image 231.

$$L_{np}(h, x) = E_x \big\| E_{j \in J} [h(x)_j] \big\|_1 \qquad \text{[Mathematical expression 5]}$$

wherein the x represents the original noisy image 210, and the h(x) the first predicted image 231.

The first network 131 (as the noise extractor h) performs data distribution matching to thus improve denoising quality, but it causes some of texture details and color changes in a texture-abundant image to be lost. This is because the first network 131 overfits to the real noise of the second self-supervised loss as well as the aliasing artifacts of the $PD_2$. The aliasing artifacts contribute to the texture details and the sizes thereof are larger than the real noise.

To upgrade the texture details, accordingly, the fourth self-supervised loss is proposed. The fourth self-supervised loss limits (that is, penalizes high noise) the distribution of the first predicted image 231 produced through the first network 131 using L1 regularization term. The L1 regularization term takes average absolute values by pixel according to mini batch and color axes to effectively suppress the outlier of the pseudo-noise map of the second self-supervised loss.

As a result, a total self-supervised loss for the first network 131 and the second network 132 is defined by the following mathematical expression 6.

$$L_{total} = \lambda_s L_s(f, x, \tau) + \lambda_r L_r(f, h, x) + \qquad \text{[Mathematical expression 6]}$$
$$\lambda_{ov} L_{ov}(f, h, x, \tau) \lambda_{np} L_{np}(h, x)$$

wherein the hyperparameters $\lambda_s$, $\lambda_r$, $\lambda_{ov}$, and $\lambda_{np}$ represent the contribution weights of the first to fourth self-supervised losses.

The learning unit 140 performs the learning for the first network 131 and the second network 132, based on the first to fourth self-supervised losses.

For example, the learning unit 140 applies the first self-supervised loss to the third predicted image 233 and the original noisy image 210, applies the second self-supervised loss to the difference value among the fourth predicted image 234, the original noisy image 210, and the first predicted image 231, applies the third self-supervised loss to the third predicted image 233 and the pseudo-noise map, and applies the fourth self-supervised loss to the first predicted image 231, so that the learning unit 140 performs the learning for the first network 131 and the second network 132 to thus produce a denoising model.

FIG. 5 shows the learning process of the predicted image producing unit 130 according to the present invention.

Referring to FIG. 5, the blind denoising device 100 performs the $PD_2$ or $PD_5$ process for the original noisy image 210 to produce at least one or more downsampled images 220.

The blind denoising device 100 allows the predicted image producing unit 130 to eliminate the noise from the original noisy image 210 and the downsampled images 220 using the first network 131 and the second network 132, as shown in the forward process of FIG. 5, to thus produce at least one or more predicted images 230 restored to the shape of the original noisy image 210. The restoring process to the shape of the original noisy image 210 is the process of the $PD_S^{-1}(\cdot, \cdot)$ as shown in FIG. 5 that restores the images from which noise is eliminated according to the PD to the shape of the original noisy image 210 again.

The blind denoising device 100 allows the learning unit 140 to perform the optimized learning for the first network 131 and the second 132 of the predicted image producing unit 130, based on the first to fourth self-supervised losses, the first to fourth predicted images 231 to 234, and the original noisy image 210, as shown in the backward process of FIG. 5.

After the learning for the first network 131 and the second network 132 has been performed to minimize the total loss according to the backward learning process as shown in FIG. 5, some visual artifacts may remain in the baseline learning results due to the structural limitations of the first network 131 and the second network 132. Accordingly, a denoising process as shown in FIG. 6 is performed.

Figure 6:
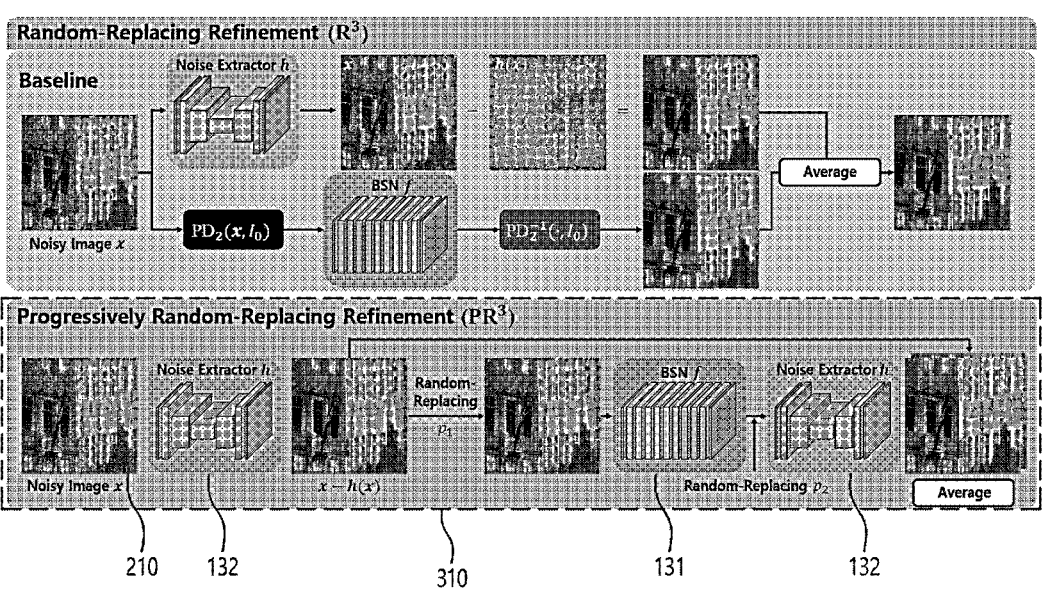
FIG. 6 shows a denoising process of a denoising model according to the present invention.

FIG. 6 shows a denoising process of a denoising model 310 according to the present invention.

The $R^3$ proposed in the conventional AP-BSN is a technique that releases visual artifacts. However, if multiple prediction for various noisy samples are averaged, content similarity is increased and texture details are decreased. Further, the baseline of the $R^3$ is dependent on initial prediction where the texture details are decreased by the $PD_2$ process. To solve such disadvantages of the $R^3$, according to the present invention, progressively random-replacing refinement ($PR^3$) as shown in FIG. 6 is proposed as the denoising model 310.

Referring to FIG. 6, a baseline as a basic interference model that performs the ensemble of the predicted results of the denoising model and the BSN 131 and the $PR^3$ technique used for the denoising model 132 and the BSN 131 according to the present invention are shown.

In the conventional practice, the $PD_2$ process is additionally performed even in the denoising process, thereby causing resource increase due to denoising and bad-quality results, and contrarily, in the case of the $PR^3$ as the denoising model 310 according to the present invention, the images for which the PD process has been already performed are used to thus omit additional PD process, so that the text of the output is not crushed in the random replacing process, thereby ensuring high-quality outputs and effectively removing the structure artifacts of the image produced through the second network 132.

Referring to FIG. 6, a process in which the denoising model 310 eliminates noise from the original noisy image 210 is shown.

In specific, if the original noisy image x 210 with noise is inputted to the first network 131, the denoising model 310 removes the first predicted image from the original noisy image 210 through the first network 131 and then produces $P_1$ as the x–h(x) image as shown in FIG. 6, which is restored to the shape of the original noisy image 210, through the random-replacing.

After that, the denoising model 310 inputs the produced $P_1$ to the second network 132, performs denoising and random-replacing to produce $P_2$, and inputs the produced $P_2$ to the first network 131. Lastly, the denoising model 310 detects and removes the noise from the $P_2$ through the first network 131 and performs averaging between the $P_2$ from which the noise is removed and the x–h(x) image to have last denoising.

Figures 7, 8:
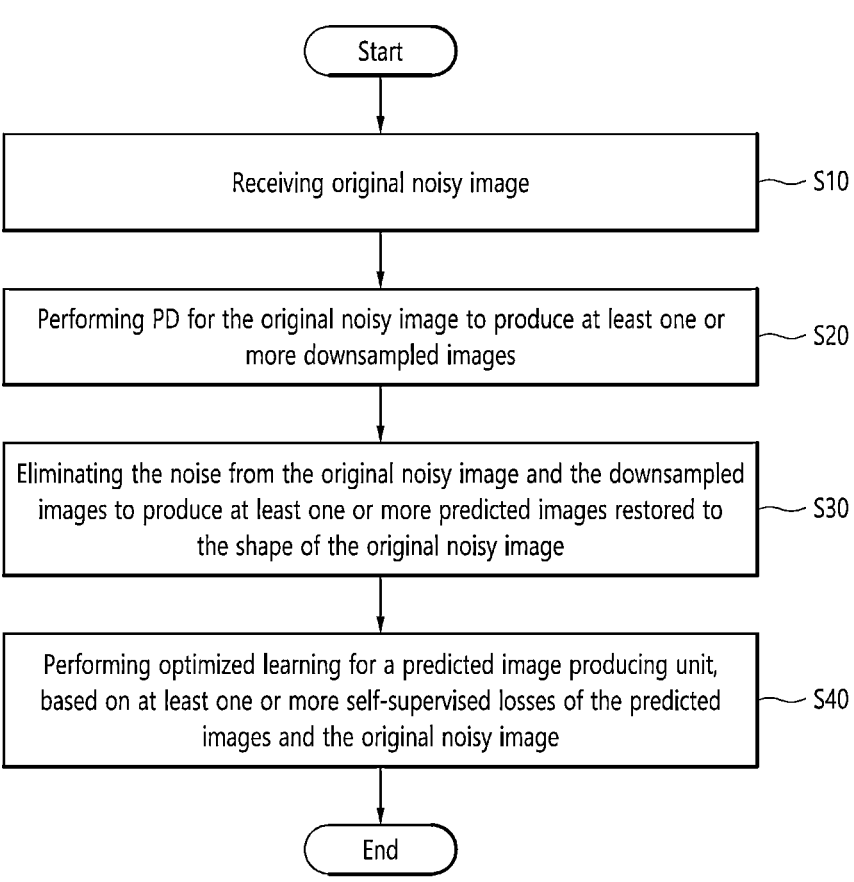
FIG. 7 is a flowchart showing learning steps of the blind denoising device according to the present invention.
FIG. 8 is a table showing denoising performance according to the present invention.

FIG. 7 is a flowchart showing learning steps of the blind denoising device 100 according to the present invention.

A blind denoising method according to the present invention is performed in the same configuration as the blind denoising device 100 as shown in FIG. 1 and the predicted image producing unit 130 as shown in FIG. 2. Therefore, the corresponding parts to the parts as shown in FIGS. 1 and 2 are given with corresponding reference numerals and the repeated explanation on the corresponding parts will be avoided.

The blind denoising method according to the present invention includes the steps of receiving an original noisy image (at step S10), performing PD for the original noisy image to produce at least one or more downsampled images (at step S20), removing noise from the original noisy image and the downsampled images to produce at least one or more predicted images restored to the shape of the original noisy image (at step S30), and performing optimized learning for the predicted image producing unit 130, based on at least one or more self-supervised losses of the predicted images and the original noisy image (at step S40).

The step of receiving an original noisy image (at step S10) is performed by receiving the original noisy image from an external server or device.

The step of performing PD for the original noisy image to produce at least one or more downsampled images (at step S20) is performed by producing the at least one or more downsampled images from the original noisy image according to at least one or more stride factors.

The step of removing noise from the original noisy image and the downsampled images to produce at least one or more predicted images restored to the shape of the original noisy image (at step S30) includes the steps of removing the noise from the original noisy image and the downsampled images through a first network 131, removing the noise from the downsampled images according to the stride factors through a second network 132, and restoring the shape of the original noisy image from the images from which the noise is removed through the first network 131 and the second network 132 to produce the predicted images through a restoring unit 133.

The step of performing optimized learning for the predicted image producing unit 130, based on at least one or more self-supervised losses of the predicted images and the original noisy image (at step S40) includes the step of performing learning for the first network 131 and the second network 132, based on a first self-supervised loss defining a loss of the second network 132 itself, a second self-supervised loss for supporting residual noise learning of the first network 131, a third self-supervised loss for enhancing the similarity between the predicted images 230 produced through the first network 131 and the second network 132, and a fourth self-supervised loss for limiting the distribution of the predicted images 230 produced through the first network 131.

Figure 9:
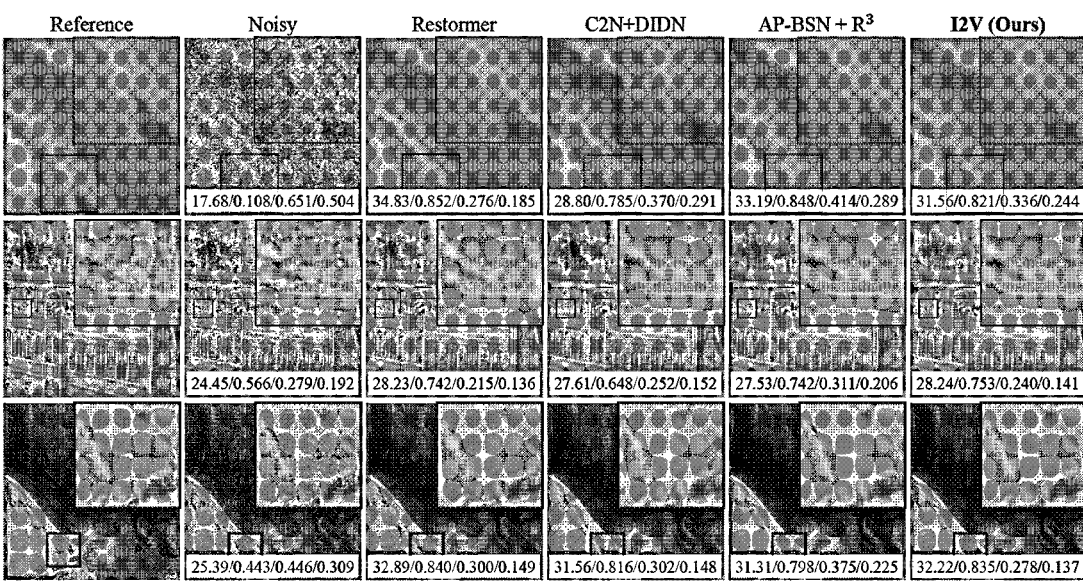
FIG. 9 shows denoising results of blind denoising methods according to the present invention.

FIG. 8 is a table showing denoising performance according to the present invention, and FIG. 9 shows denoising results of blind denoising methods according to the present invention.

FIG. 8 is a table showing ablation study results of the self-supervised losses for smartphone image denoising dataset (SIDD). Referring to FIG. 8, results where self-supervised losses do not exist are provided on columns, maximum and second-maximum results are underlined, and the maximum results are bolded.

If the second self-supervised loss $L_r$ is omitted in FIG. 8, details-based learning does not exist in the second network (BSN f), except the content information maintaining through the third self-supervised loss $L_{ov}$, thereby resulting in overall performance degradation.

If the third self-supervised loss $L_{ov}$ is omitted, the performance of PSNR and SSIM is improved, but minimal performance degradation is observed in LPIPS and DISTS.

This is because the third self-supervised loss $L_{ov}$ promotes content similarity and provides higher PSNR and SSIM results, instead of improving texture restoration performance.

If the fourth self-supervised loss $L_{np}$ is omitted, overfitting is generated from the pseudo-noise map of the second network (BSN f) if there is no noise prior to the loss, thereby causing the LPIPS and DISTS results to be close to the AP-BSN results. That is, the fourth self-supervised loss $L_{np}$ prevents the first network (noise extractor h) to learn the aliasing artifacts on the pseudo-noise map to thus successfully reduce texture deformation.

Additionally, if the order-variant PD process in the first self-supervised loss $L_s$ and the third self-supervised loss $L_{ov}$ is replaced with order-invariant PD (PDs($\cdot$, $I_0$), overall performance degradation occurs.

According to the study results as shown in FIG. 8, in the case where the respective self-supervised losses are omitted when I2V as the optimized learning of the predicted image producing unit and the basic learning process are used, some of performance may be degraded, but when all of the self-supervised losses are used, overall performance is upgraded.

FIG. 9 shows denoising results of blind denoising methods according to the present invention.

In FIG. 9, completely self-supervised blind denoising tests are carried out, without external education dataset, to achieve wide adaptation of the I2V. In the tests, it is assumed that only target noisy images are used.

In the case of an image denoising method not paired with a supervised learning approach method, a self-supervised method is learned to allow the noise remover (e.g., the first network or the second network) to assume the true application scenario of the entire image using SIDD-Medium dataset.

The self-supervised learning-based method according to the present invention directly makes use of a subject noisy image to learn a deep learning model. If not so, the supervised denoising method or the image denoising method not paired may perform the learning with the clean and much noisy image included in different datasets. The different datasets have different texture or structure information from the subject noisy image. As a result, the method according to the present invention is similar in the LPIPS and DISTS to the supervised learning approach method or has better performance than the supervised learning approach method.

Referring to FIG. 9, restoration transformer (Restormer) is a supervised learning-based denoising method, a clean-to-noisy image generation framework, namely C2N is an unpaired image denoising method requiring unpaired clean image data, and AP-BSN and I2V are methods only using noisy images. Bottom numbers represent the performance of PSNR/SSIM/LPIPS/DISTS in the order from the left.

As appreciated from FIG. 9, the I2V according to the present invention shows the maximum effectiveness among state-of-the art self-supervised denoising methods for all matrices. Further, the I2V according to the present invention obtains better texture and LPIPS and DISTS results when compared with the most recent method, AP-BSN.

Further, the blind denoising method according to the present invention may be implemented in the form of a program instruction that can be performed through various computers, and may be recorded in a computer readable recording medium. The computer readable medium may include a program command, a data file, a data structure, and the like independently or in combination.

The program instruction recorded in the computer readable recording medium is specially designed and constructed for the present disclosure, but it may be well known to and may be used by those skilled in the art of computer software.

The computer readable recording medium may include a magnetic medium such as a hard disc, a floppy disc, and a magnetic tape, an optical recording medium such as a Compact Disc Read Only Memory (CD-ROM) and a Digital Versatile Disc (DVD), a magneto-optical medium such as a floptical disk, and a hardware device specifically configured to store and execute program instructions, such as a Read Only Memory (ROM), a Random Access Memory (RAM), and a flash memory.

Further, the program command may include a machine language code generated by a compiler and a high-level language code executable by a computer through an interpreter and the like. The hardware device may be configured to operate as one or more software modules in order to perform operations of the present disclosure, and vice versa.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A blind denoising device comprising:
a receiver for receiving an original noisy image;
a Pixel-shuffle Downsampler (PD) for performing PD for the original noisy image to produce at least one or more downsampled images;
a predicted image producer for eliminating the noise from the original noisy image and the downsampled images to produce at least one or more predicted images restored to the shape of the original noisy image; and
a learner for performing optimized learning for the predicted image producer, based on at least one or more self-supervised losses of the predicted images and the original noisy image,
wherein the predicted image producer comprises:
a first network for eliminating the noise from the original noisy image and the downsampled images;
a second network for eliminating the noise from the downsampled images according to the at least one or more stride factors; and
a restorer for restoring the shape of the original noisy image from the images from which the noise is eliminated through the first network and the second network to thus produce the predicted images.

2. The blind denoising device according to claim 1, wherein the PD produces the at least one or more downsampled images from the original noisy image according to at least one or more stride factors to thus augment data of the original noisy image.

3. The blind denoising device according to claim 2, wherein the PD performs order-variant PD using transformation matrices selected randomly, and the transformation matrices are shuffled in the sampling order.

4. The blind denoising device according to claim 1, wherein the learner performs learning for the first network and the second network, based on a first self-supervised loss defining a loss of the second network, a second self-supervised loss for supporting residual noise learning of the first network, a third self-supervised loss for enhancing the similarity between the predicted images produced through the first network and the second network, and a fourth self-supervised loss for limiting the distribution of the predicted images produced through the first network.

5. The blind denoising device according to claim 4, wherein the first self-supervised loss defines the loss of the second network from a difference between the predicted image produced through the second network and the original noisy image.

6. The blind denoising device according to claim 4, wherein the second self-supervised loss is defined as a difference between a pseudo-noise map and the predicted image produced through the first network, the pseudo-noise map is produced from a difference between the original noisy image and the predicted image produced through the second network, and the predicted image produced through the first network is the predicted image from the original noisy image.

7. The blind denoising device according to claim 4, wherein the third self-supervised loss is defined, based on a difference image between the original noisy image and the predicted image produced through the first network and a difference value between the predicted images produced through the second network, to enhance the similarity of low-frequency characteristics between the predicted image produced through the first network and the predicted image produced through the second network, and the predicted images produced through the first network and the second network are the predicted images from the downsampled images according to the same stride factor.

8. The blind denoising device according to claim 4, wherein the fourth self-supervised loss is noise prior loss that penalizes noise having higher size than a threshold value to allow the noise distribution of the predicted image produced through the first network to be close to the noise distribution of the original noisy image, and the predicted image produced through the first network is the predicted image from the original noisy image.

9. A blind denoising method comprising the steps of:
receiving an original noisy image;
performing PD for the original noisy image to produce at least one or more downsampled images;
eliminating the noise from the original noisy image and the downsampled images to produce at least one or more predicted images restored to the shape of the original noisy image; and
performing optimized learning for a predicted image producer, based on at least one or more self-supervised losses of the predicted images and the original noisy image, wherein the step of producing at least one or more predicted images comprises the steps of:

eliminating the noise from the original noisy image and the downsampled images through a first network;

eliminating the noise from the downsampled images according to different stride factors through a second network; and restoring the shape of the original noisy image from the images from which the noise is eliminated through the first network and the second network to thus produce the predicted images through a restorer.

10. The blind denoising method according to claim 9, wherein the step of performing optimized learning for a predicted image producer comprises the step of performing learning for the first network and the second network, based on a first self-supervised loss defining a loss of the second network, a second self-supervised loss for supporting residual noise learning of the first network, a third self-supervised loss for enhancing the similarity between the predicted images produced through the first network and the second network, and a fourth self-supervised loss for limiting the distribution of the predicted images produced through the first network.

11. The blind denoising method according to claim 10, wherein the first self-supervised loss defines the loss of the second network from a difference between the predicted image produced through the second network and the original noisy image.

12. The blind denoising method according to claim 10, wherein the second self-supervised loss is defined as a difference between a pseudo-noise map and the predicted image produced through the first network, the pseudo-noise map is produced from a difference between the original noisy image and the predicted image produced through the second network, and the predicted image produced through the first network is the predicted image from the original noisy image.

13. The blind denoising method according to claim 10, wherein the third self-supervised loss is defined, based on a difference image between the original noisy image and the predicted image produced through the first network and a difference value between the predicted images produced through the second network, to enhance the similarity of low-frequency characteristics between the predicted image produced through the first network and the predicted images produced through the second network, and the predicted images produced through the first network and the second network are the predicted images from the downsampled images according to the same stride factor.

14. The blind denoising method according to claim 10, wherein the fourth self-supervised loss is noise prior loss that penalizes noise having higher size than a threshold value to allow the noise distribution of the predicted image produced through the first network to be close to the noise distribution of the original noisy image, and the predicted image produced through the first network is the predicted image from the original noisy image.

* * * * *